United States Patent
Betzen

(10) Patent No.: US 6,460,487 B1
(45) Date of Patent: Oct. 8, 2002

(54) SCENT DISPENSER FOR DEER REPELLENT DEVICE

(76) Inventor: Keith M. Betzen, P.O. Box 5604, Bloomington, IN (US) 47407-5604

( * ) Notice: Subject to any disclaimer, the term of this patent is extended or adjusted under 35 U.S.C. 154(b) by 0 days.

(21) Appl. No.: 09/577,387

(22) Filed: May 25, 2000

(51) Int. Cl.⁷ ............................................. A01K 37/00
(52) U.S. Cl. .................................... 119/712; 119/719
(58) Field of Search .......................... 119/53, 53.5, 54, 119/56.1, 711, 712, 707, 719; 43/1; 239/47

(56) References Cited

U.S. PATENT DOCUMENTS

| | | | |
|---|---|---|---|
| 4,374,571 A | 2/1983 | Hirvela | 239/36 |
| 4,630,571 A | 12/1986 | Palmer | 119/712 |
| 4,773,178 A | 9/1988 | Marek | 43/2 |
| 4,989,547 A | 2/1991 | Eaton | 119/51.11 |
| 5,242,111 A | 9/1993 | Nakoneczny et al. | 239/47 |
| 5,279,062 A | 1/1994 | Burgeson | 43/1 |
| 5,307,584 A | 5/1994 | Jarvis | 43/1 |
| 5,359,801 A | 11/1994 | Mattucci et al. | 43/1 |
| 5,429,271 A | 7/1995 | Porter | 222/3 |
| 5,461,814 A | 10/1995 | Reid | 43/1 |
| 5,465,521 A | 11/1995 | Baker et al. | 43/1 |
| 5,529,243 A | 6/1996 | Hoyt et al. | 239/56 |
| 5,622,314 A | 4/1997 | Eason | 239/47 |
| 5,744,106 A | 4/1998 | Eagle | 422/306 |
| 5,832,648 A | 11/1998 | Malone | 43/1 |
| 5,857,281 A | 1/1999 | Bergguist et al. | 43/1 |
| 5,894,818 A | 4/1999 | Betzen | 119/712 |
| 5,970,643 A | 10/1999 | Gawel, Jr. | 43/1 |
| 5,971,208 A | 10/1999 | Kennedy | 222/54 |
| 6,014,951 A | 1/2000 | Betzen | 119/712 |
| 6,038,805 A | 3/2000 | Smidtke | 43/1 |
| 6,050,016 A | 4/2000 | Cox | 43/1 |
| 6,116,192 A * | 9/2000 | Hultine et al. | 119/719 |
| 6,199,311 B1 * | 3/2001 | Foster | 119/711 |
| 6,250,255 B1 * | 6/2001 | Lenhardt et al. | 119/719 |

* cited by examiner

Primary Examiner—Charles T. Jordan
Assistant Examiner—Elizabeth Shaw

(57) ABSTRACT

In order to deter deer from a protected area, a portable, wireless, shock producing, deer repelling and training device is provided comprising a field unit having an improved scent dispenser which is aerodynamically configured such that air movement across the device causes a negative pressure and turbulence inside the scent dispenser which increases evaporation and dispersal of the perfumed oil used as an attractant scent source on the device. The deer repellent devices are deployed such that deer in the protected area will be attracted by the scent to touch the device, whereupon they will receive an electric shock and are frightened from the area. Deer will then continue to avoid the protected area because of a scarecrow effect provided by the presence of the device.

6 Claims, 1 Drawing Sheet

SCENT DISPENSER FOR DEER REPELLENT DEVICE

FIELD OF THE INVENTION

This invention relates to scent dispensers used on animal control devices, particularly to a scent dispenser used on a shock-producing, deer repelling and training device in which air movement in the vicinity of the device causes a negative pressure and turbulence inside the scent dispenser which increases evaporation and dispersal of the scent source used as an attractant on the device.

BACKGROUND OF THE INVENTION

The control of damage caused by deer and other animals is an ongoing challenge. Deer repelling and training devices which deliver an electric shock and which use a scent to attract the deer to touch the device have proven to be very effective in altering deer behavior, resulting in immediate retreat and long term avoidance behaviors.

Various configurations of scent dispensers have been described for animal deterrent devices and for attracting animals for hunting.

U.S. Pat. No. 4,374,571 to Hirvela (1983), U.S. Pat. No. 5,242,111 to Nakoneczny (1993), U.S. Pat. No. 5,307,584 to Jarvis (1994), U.S. Pat. No. 5,465,521 to Baker (1995), U.S. Pat. No. 5,529,243 to Hoyt (1996), U.S. Pat. No. 5,622,314 to Eason (1997), U.S. Pat. No. 5,832,648 to Malone (1998) and U.S. Pat. No. 5,857,281 to Bergquist (1999) show variations of containers and exposed wicks used on scent dispensers that rely only on simple air movement without additional dispersal means being provided.

U.S. Pat. No. 4,989,547 to Eaton (1991) and U.S. Pat. No. 5,970,643 to Gawel (1999) show scent dispensers that require an electric fan to disperse the scent.

U.S. Pat. No. 5,461,814 to Reid (1995) shows a device that uses the mechanical motion of a person walking to distribute scent.

U.S. Pat. No. 5,279,062 to Burgeson (1994) and U.S. Pat. No. 5,971,208 to Kennedy (1999) show scent dispensers that operate using the expansion and contraction caused by the heating and cooling of the sun to dispense a scented liquid.

U.S. Pat. No. 4,773,178 to Marek (1988), U.S. Pat. No. 5,359,801 to Mattucci (1994), U.S. Pat. No. 5,429,271 to Porter (1995), U.S. Pat. No. 5,744,106 to Eagle (1998), U.S. Pat. No. 6,038,805 to Smidtke (2000) and U.S. Pat. No. 6,050,016 to Cox (2000) show scent dispensers that require a heat source to evaporate the scent that is used.

U.S. Pat. No. 4,630,571 to Palmer (1986) shows an electrical device to reaction train animals but provides only a flat area which is exposed to the weather for the lure and does not describe the lure to be used.

U.S. Pat. No. 5,894,818 to Betzen (1999) describes a baited, shock-producing, animal repelling and training device in which the deterrent voltage maintained across the electrodes is stored in a capacitor. This innovation of using a capacitor to store the deterrent energy in a baited animal control device allowed the creation of a small wireless device which delivers a single pulse of high voltage energy with a very low amperage, a very short discharge time and a short current path through the nose of the deer attracted to the bait used on the device. A flat area for bait which is exposed to the weather is provided and a suggested bait is peanut butter.

U.S. Pat. No. 6,014,951 to Betzen (2000) shows a deer repellent device having circular electrodes which are opposed at ninety degrees to enclose the scent dispenser which is described as a wick which is soaked with a perfumed oil.

The prior art devices disclosed herein do not provide a scent dispenser for use on a shock-producing, deer repelling and training device in which air movement in the vicinity of the device causes a negative pressure and turbulence inside the scent dispenser which increases evaporation and dispersal of the perfumed oil used as an attractant on the device.

SUMMARY OF THE INVENTION

It is evident that all of the prior art devices disclosed herein suffer from various disadvantages which limit their efficiency. Accordingly, various objects and features of the device of the present invention are described subsequently which increase the efficiency of, and eliminate problems associated with, the prior art scent dispensing devices.

The principal object of the present invention is to provide a scent dispenser for use on a shock-producing, deer repelling and training device in which air movement across the device causes a negative pressure inside the scent dispenser which results in increased evaporation and dispersal of the scent source.

Another object of the present invention is to provide a scent dispenser for use on a shock-producing, deer repelling and training device in which the attractant scent source is protected from the weather by a convex shaped top cover and which is therefore suitable for long term outdoor use.

Another object of the present invention is to provide a scent dispenser for use on a shock-producing, deer repelling and training device which has a generally convex shaped top cover such that air moving in the vicinity of the device will have a longer path to pass over the top of the scent dispenser and a shorter path to pass through the scent dispenser.

Another object of the present invention is to provide a scent dispenser for use on a shock-producing, deer repelling and training device which has a dome shaped top or other shape which will aerodynamically resemble the wing of a bird or a plane and which functions such that air movement in the vicinity of the device results in decreased pressure, turbulence and air movement inside the scent dispenser which otherwise would be a calm, protected spot.

The innovation of the present invention improves the technology previously described and the present invention has all of the advantages of the. previously described technology but without the disadvantages. Therefore, it can be seen that the combination of features incorporated into the device of the present invention solves prior problems associated with scent dispensers used on animal repelling and training devices. It can also be seen that the device of the present invention produces new and unobvious results that have not been produced by the prior art.

Additional features will become apparent from a consideration of the ensuing drawings and description.

DESCRIPTION OF THE PREFERRED EMBODIMENTS

The scent dispenser means of the present invention may vary widely in its configuration and composition. The preferred embodiment described herein provides a simple method to make a scent dispenser, which increases dispersal of a scented oil, for use on a portable, shock-producing, deer repellent device.

Figure 1:
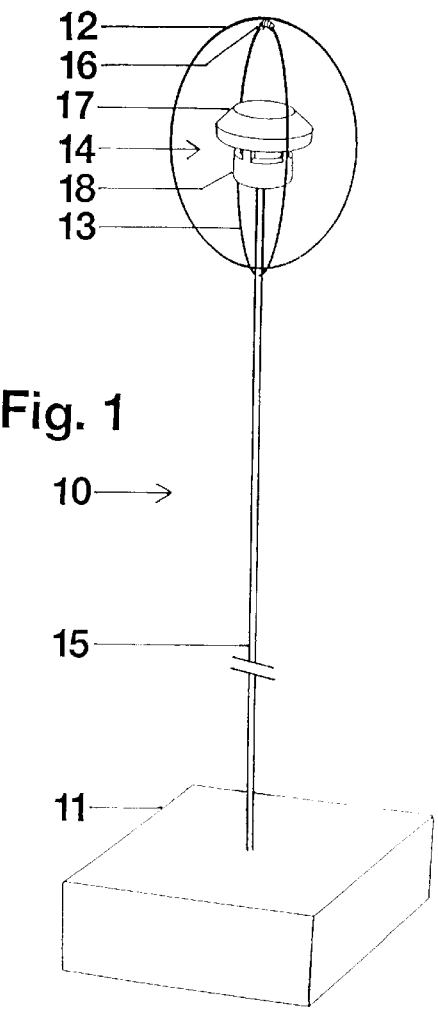
FIG. 1 shows a perspective view of a typical embodiment of the present invention.

FIG. 1 shows a typical embodiment of a portable, shock-producing, deer repellent device 10 which consists of a field unit with a protective housing 11 to contain the batteries and electronic components which maintain a predetermined voltage across the electrodes. The unit will have a top electrode 12 and a bottom electrode 13 which are made from 0.020" un-insulated stainless steel wire. The bare wire electrodes are about 1½ inches in diameter and are opposed at ninety degrees to enclose the scent dispenser 14 so that a deer, attracted to the scent, will touch the electrodes and receive an electric shock.

The scent dispenser 14 consists of the dome shaped top cap 17 to protect the unit from the weather, and the reservoir 18. The field unit has a stem 15 to carry the conductors from the electrodes to the electronics and as support means to position and to support the components. The electrode separator 16 holds the electrodes in the desired position.

Figure 2:
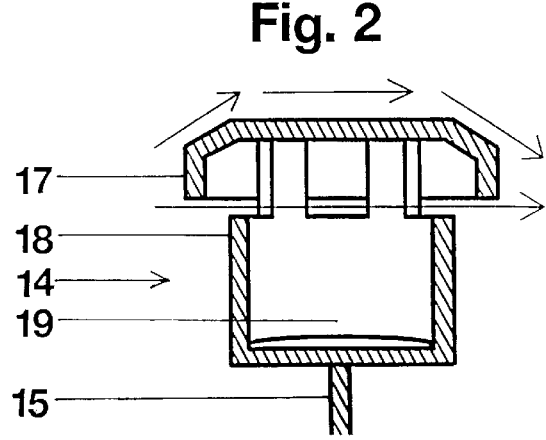
FIG. 2 shows a cross section of the scent dispenser used on the device with arrows showing the path of air flow through and over the scent dispenser.

FIG. 2 shows a cross sectional view of the scent dispenser 14 with the dome shaped top cap 17 serving to protect from weather the reservoir 18 which holds the area for the scent source 19. The reservoir 18 has a slotted upper edge to allow air passage over the area for the scent source 19, with one of the slots extending lower (not illustrated) to allow attractant to be added to the device. In the preferred embodiment, the scent source 19 is a liquid perfumed oil held by a polyester felt or other substrate, however, it could also be a polymer impregnated with a scent or it could be other substances that would release an attractant scent.

The arrows in FIG. 2 show air flow through the scent dispenser 14. The path of air passing over the top, shown by the upper arrows, is longer than the path of air passing through, shown by the lower arrow. This difference in air flow results in a negative pressure and turbulence inside the scent dispenser 14 which serves to increase the evaporation and the dispersal of the scent.

Figure 3:
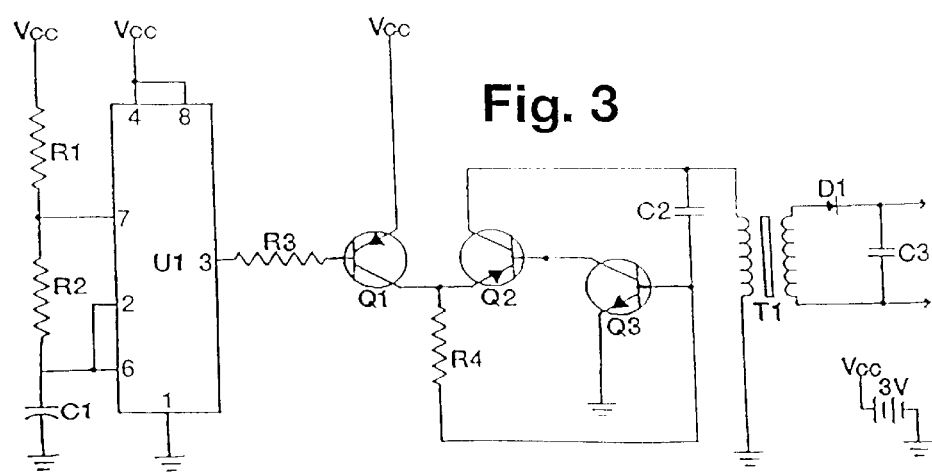
FIG. 3 shows a schematic drawing of a typical circuit used in the device.

FIG. 3 shows a schematic of a circuit that can be used to charge capacitor, C3, to about 310 volts when the battery voltage is about 3.1 volts and when transformer, T1, has a primary/secondary ratio of $\frac{1}{138}$ with 27 primary windings. T1 has a 20 milliwatt power rating, a primary impedance of 8 ohms, and is operating in this circuit at 14 Khz. The values of the resistors are: R1=2.7 M, R2=10 K, R3=470 and R4=33 K. All resistors are ⅛ watt. The values of the capacitors are: C1=470 uf, 10 volt, electrolytic; C2=0.047 uf, 10 volt, ceramic; C3=1.5 uf, 400 volt, metalized polyester. The types of the transistors are: Q1 and Q2 are 2N2907 and Q3 is a 2N2222. The diode, D1, is a 1N4006. The timer, U1, is a ICM7555CN. The circuit shown in FIG. 3, with these component values will charge the capacitor for 3.26 seconds with an interval of 14.7 minutes between charging pulses. The charging time, the interval, the capacitance of C3 and the voltage to which C3 is charged are all variable and can be adjusted to each situation and species. The power supply for this circuit is 2 AA batteries in series. All components are readily available, except the transformer, which is custom made.

The description of the present invention contained herein is an exemplification of typical embodiments and is considered as illustrative only of the principles of this invention. Although this description contains various specificities, these should not be construed as limitations on the scope of this invention. The scent dispenser device of the present invention can be made with various materials and shapes. This scent dispenser device may be used with various scent sources. Other changes in size, color, materials, shape, form, function and manner of operation, assembly and use, are deemed readily apparent and do not depart from the scope of the present invention which is limited only by the following claims and their legal equivalents.

The invention claimed is:

1. A shock-producing, deer repelling and training device comprising a field unit with a protective housing means to enclose means to maintain a predetermined voltage across a plurality of bare electrodes, and having scent dispenser means comprising a top cover, a reservoir and an aftractant scent source means so that said deer being attracted to touch said device will complete the circuit between said electrodes and so receive an electric shock, and having support means to position said device in a protected area and to support the components, with the improvement comprising said device having an improved scent dispenser means such that air movement in the vicinity of said device causes a negative pressure inside said improved scent dispenser means which increases evaporation and dispersal of said attractant scent source used on said device, whereby said deer repelling and training device with said improved scent dispenser means functions to repel said deer from said protected area and to teach them not to return.

2. The deer repellent and training device of claim 1 having said improved scent dispenser means wherein said attractant scent source is protected from the weather by a generally convex shaped top cover.

3. The deer repellent and training device of claim 1 having said improved scent dispenser means wherein said top cover is shaped such that air moving in the vicinity of said device will have a longer path to pass over said dispenser and a shorter path to pass through said dispenser.

4. The deer repellent and training device of claim 1 having said improved scent dispenser means wherein said top cover of said dispenser will aerodynamically resemble the wing of a bird or a plane.

5. The deer repellent and training device of claim 1 having said improved scent dispenser means wherein air movement in the vicinity of said device results in turbulence inside said scent dispenser which otherwise would be a calm, protected spot.

6. A method of repelling and training deer comprising the steps of:

(a) deploying a shock-producing, deer repelling and training device comprising a field unit with a protective housing means to enclose means to maintain a predetermined voltage across a plurality of bare electrodes, and having scent dispenser means comprising a top cover, a reservoir and an attractant scent source means so that said deer being attracted to touch said device will complete the circuit between said electrodes and so receive an electric shock, and having support means to position said device in a protected area and to support the components, with the improvement comprising said device having an improved scent dispenser means such that air movement in the vicinity of said device causes a negative pressure inside said improved scent dispenser means which increases evaporation and dispersal of said attractant scent source used on said device, whereby said deer repelling and training device with said improved scent dispenser means functions to repel said deer from said protected area and to teach them not to return, (b) maintaining said deer repelling and training device having said improved scent dispenser means in said protected area to provide a scarecrow effect and so train said deer to continue to avoid said protected area.

* * * * *